C. P. HAUGHIAN.
BURGLAR-PROOF GRATING.

No. 181,070. Patented Aug. 15, 1876.

WITNESSES
Chas. J. Gooch
LeBlond Burdett

INVENTOR
Charles P. Haughian
By Knight Bro. Attorneys

UNITED STATES PATENT OFFICE.

CHARLES P. HAUGHIAN, OF BROOKLYN, NEW YORK, ASSIGNOR TO WILLIAM ARTHUR, IN TRUST FOR WILLIAM ARTHUR, CHARLES P. HAUGHIAN, CASPER D. SCHUBARTH, AND JULIUS BAUR, OF SAME PLACE, AND ALFRED B. MULLETT, OF WASHINGTON, DISTRICT OF COLUMBIA.

IMPROVEMENT IN BURGLAR-PROOF GRATINGS.

Specification forming part of Letters Patent No. 181,070, dated August 15, 1876; application filed December 18, 1875.

*To all whom it may concern:*

Be it known that I, CHARLES P. HAUGHIAN, of Brooklyn, in the county of Kings and State of New York, have invented certain new and useful Improvements in Composite Plates and Bars for Burglar-Proof Gratings for Prisons and other Structures; and I do hereby declare that the following is a correct description of the invention.

My invention consists in constructing a grating composed of composite metallic bars and plates, or plates or bars and plates of wrought iron and steel, inseparably welded, so as to prevent both cutting or breaking the bars or plates aforesaid, as hereinafter described.

Figure 1:
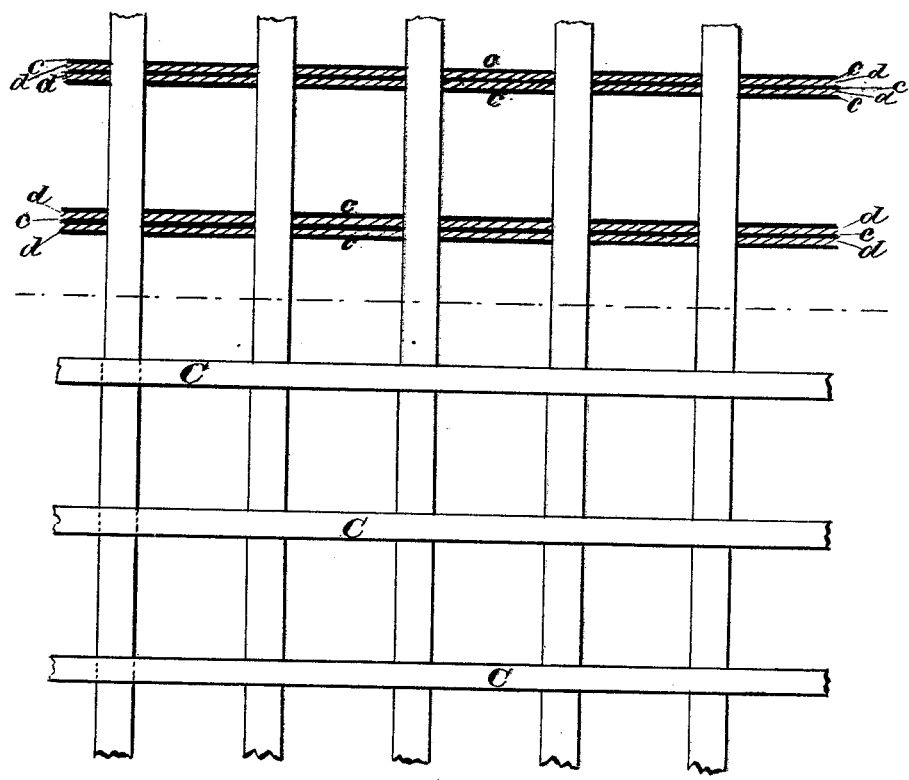
Figure 2:
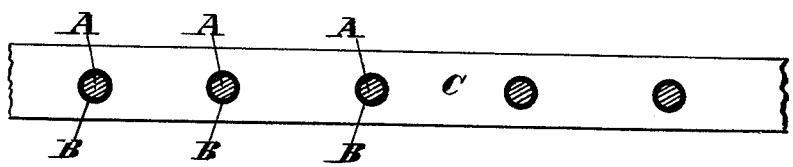

In the accompanying drawing, Figure 1 is an elevation, partly in section, of a grating made according to my invention. Fig. 2 is a horizontal section of the same on the line 2 2, Fig. 1.

A represents a core of wrought-iron, and B an external casing of steel, securely welded to the said wrought-iron core, forming a composite bar or rod of great strength, the hardened-steel exterior effectively preventing sawing or cutting, and the wrought-iron core preventing fracture. These compound rods may be inserted in plates or bars composed of alternate layers of welded steel and iron, as illustrated in the accompanying drawings; but many other forms will suggest themselves to the skilled mechanic.

C C C represent composite bars of iron and steel, $c$ being layers of steel, and $d$ layers of iron. In each case the iron and steel are securely welded together by piling, heating, and rolling, hammering, or pressing in any of the well-known modes.

It is obvious that the same result can be produced by the use of low or homogeneous steel and high steel; but the word "iron" is used herein to represent a tough metal that cannot be hardened, and "steel" to represent a metal that can be hardened to be impervious to cutting instruments.

I am aware that composite rods have before been made of concentric thicknesses of iron and steel. I am also aware that composite plates have before been made of alternate layers of iron and steel welded together.

Having thus described my invention, what I claim as new, and desire to secure by Letters Patent, is—

The grating constructed, as herein described, of compound plates of iron and steel in alternate layers, inseparably welded together, and bars constituted of iron cores A, with steel casings B welded thereto, the whole constituting a grating for use in prisons or other structures, or for the protection of banks or other buildings.

C. P. HAUGHIAN.

Witnesses:
A. B. MULLETT,
C. D. SCHUBARTH.